May 19, 1953        A. F. ALBANO        2,638,767
CIRCULATING MEANS FOR AUTOMATIC COOKERS OR WASHERS
Filed April 28, 1949        2 Sheets-Sheet 1
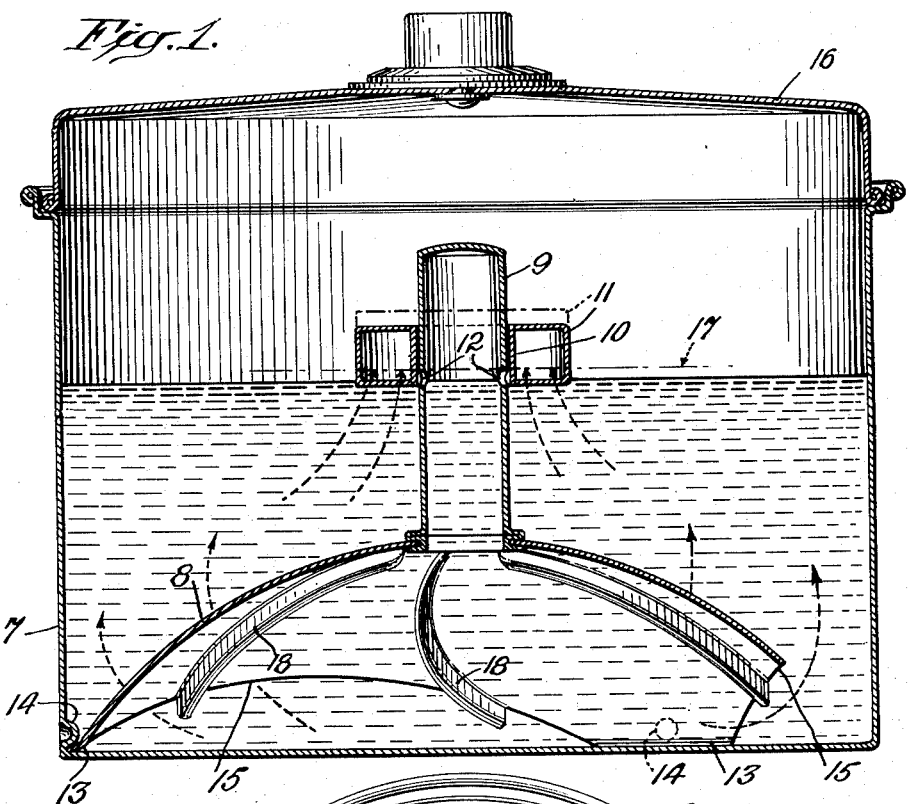
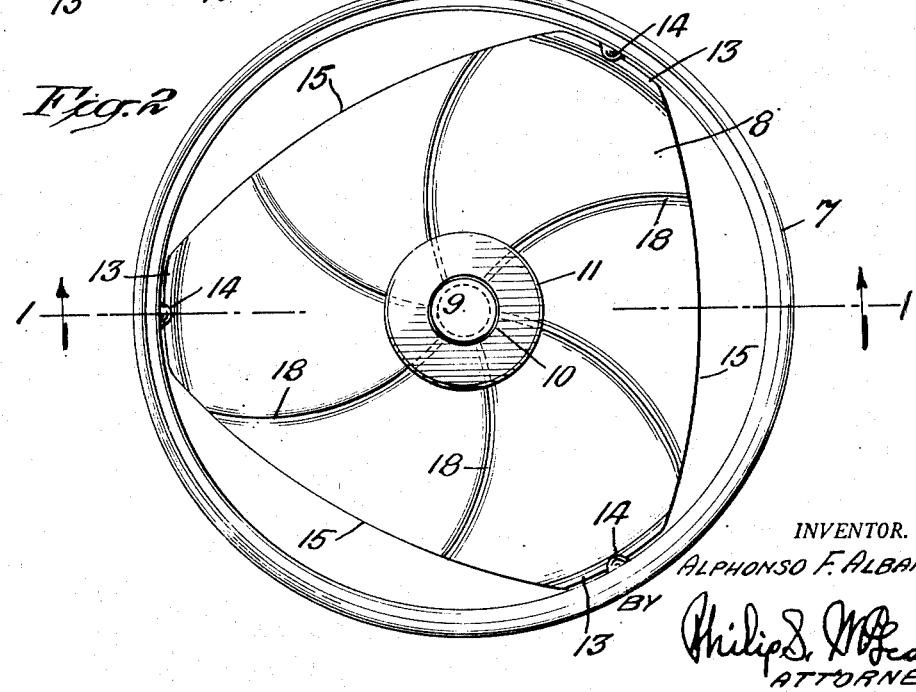
INVENTOR.
ALPHONSO F. ALBANO
BY
ATTORNEY May 19, 1953  A. F. ALBANO  2,638,767
CIRCULATING MEANS FOR AUTOMATIC COOKERS OR WASHERS
Filed April 28, 1949  2 Sheets-Sheet 2
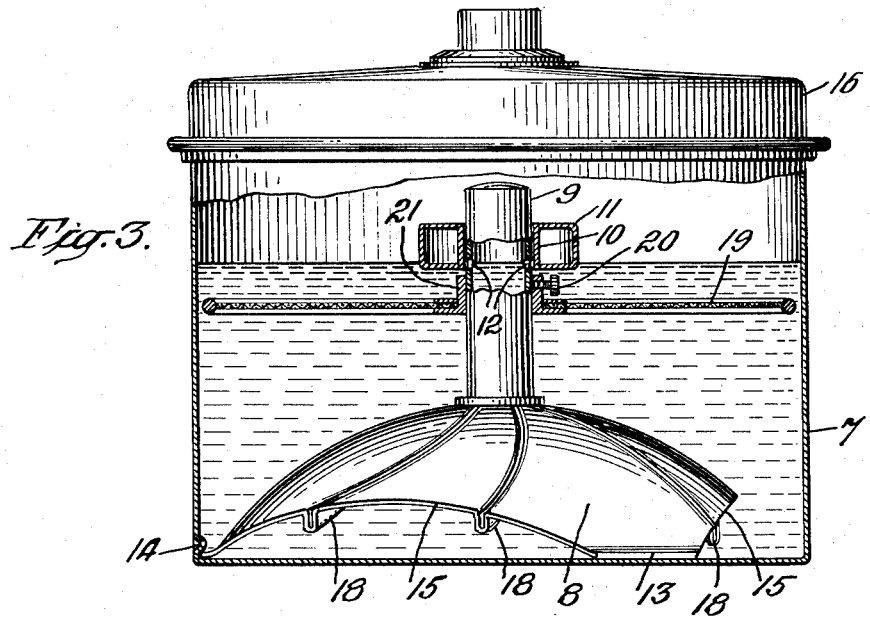
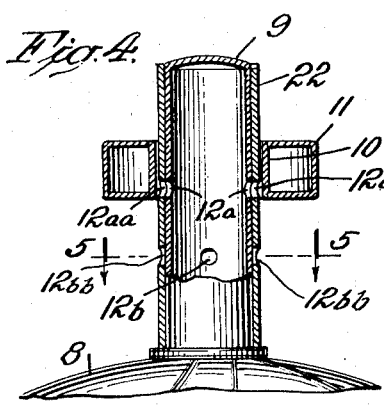
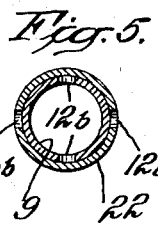
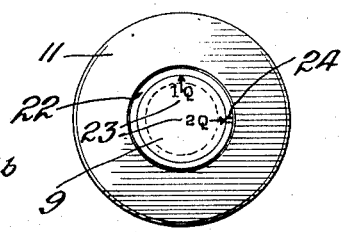
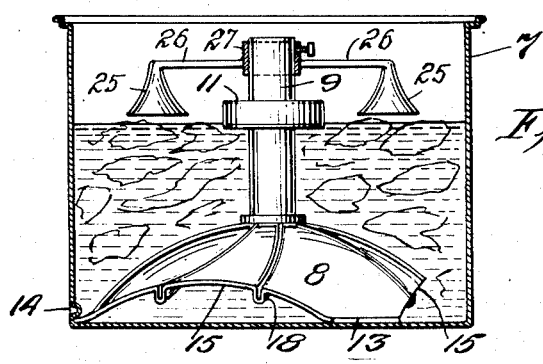
INVENTOR.
ALPHONSO F. ALBANO
BY
*Philip S. McLean*
ATTORNEY Patented May 19, 1953

2,638,767

UNITED STATES PATENT OFFICE 2,638,767

CIRCULATING MEANS FOR AUTOMATIC COOKERS OR WASHERS

Alphonso Frank Albano, Poughkeepsie, N. Y.

Application April 28, 1949, Serial No. 90,058

2 Claims. (Cl. 68—193)

The invention herein disclosed relates to cooking and washing utensils and the broad, general objects of the invention are to provide apparatus which will automatically provide the turbulence and circulation necessary or desirable for practical cooking or washing purposes.

Particular objects of the invention are to provide apparatus of the character indicated which will be of simple construction, consist of but few parts not likely to get out of order, which will be wholly automatic in its operation and which will be practical and efficient in every way.

Special objects of the invention also are to provide a construction which when used for cooking purposes will effect proper stirring and circulation of the more or less non-uniform, part liquid and part solid contents and which will accomplish a desired, substantially uniform cooking of the same and which may be used over long as well as short cooking periods without danger of burning the contents.

Further special objects of the invention are to provide a construction which may be readily assembled for use and which may be quickly taken apart and easily cleaned.

Additional objects of the invention are to provide a structure accomplishing all the above, which may be produced at relatively low cost.

Further objects of the invention are to provide a construction which will automatically create a rotary or gyratory circulation as well as or in addition to a vertical movement of contents and which may be quickly adjusted or set to operate at different levels of liquid contents.

Other desirable objects attained by the invention are set forth or will appear in the course of the following specification.

The drawings accompanying and forming part of the specification illustrate certain present commercial embodiments of the invention. Structure, however, may be modified and changed as regards such illustrations, all within the true intent and broad scope of the invention as hereinafter defined and claimed.

Fig. 1 in the drawings is a vertical sectional view showing the apparatus operating as a cooker, as on substantially the plane of line 1—1 of Fig. 2;

Fig. 2 is a top plan view with cover removed;

Fig. 3 is a broken part vertical sectional view on a smaller scale showing the apparatus in use as a clothes washer;

Fig. 4 is a broken vertical sectional detail showing a rotatably adjustable valve construction for different liquid levels;

Fig. 5 is a horizontal sectional view as on line 5—5 of Fig. 4;

Fig. 6 is a plan view of the parts appearing in Fig. 4.

Fig. 7 is a broken part sectional detail of a further modification of the washer.

As shown particularly in Figs. 1 and 3, the apparatus comprises in connection with a pot or boiler 7, a steam or pressure dome 8 having a riser 9 and a float operated relief valve 10 controlling communication between the interior of the riser and the surrounding contents of the pot.

For simplicity, the float valve 10 is shown as made up by the inner annular wall of a doughnut form of annular float 11 surrounding and sliding over the riser 9 to close or to open up one or more of the relief openings 12 in the side of the riser.

This form of float valve is simple and direct and quickly and easily taken apart for cleaning or other purposes.

The pressure dome 8 is shown as supported on the bottom of the pot and as held down solidly in that position by having three equidistantly separated flange sections 13 of substantially the full interior diameter of the pot and forming feet which, by relative rotation over the pot bottom, can be engaged beneath lugs 14 shown as integral projections struck inward from the side wall of the pot, just above the bottom.

The sides of the dome are shown cut away at 15 between the supporting feet to provide free flow passages between the inside of the dome and the surrounding pot.

The pot may usually be provided with a suitable cover such as that indicated at 16.

In operation, with the pot filled to an extent where the float will close the valve opening or openings 12 in the riser or column 9, pressure will develop within the dome and riser as steam is generated through application of heat to the pot bottom. Such pressure will eventually be effective to force liquid contents within the dome outwardly into the pot by way of the passages beneath the edge of the dome at 15, producing a rise in level of the pot contents, as indicated by broken line 17, Fig. 1.

This rise in liquid level lifts the float 11, uncovering valve openings 12 to relieve pressure within the dome, and this release of pressure permits the liquid level to drop, lowering the float to again close off the relief openings 12.

Consequently the apparatus only needs to be placed on the stove or other heat supply with contents supporting the float valve in closed position. Then, as soon as pressure is created through development of steam within the contents confined in the dome, the liquid will be intermittently raised and lowered, flowing back and forth between the dome and pot at a more or less uniform and rapid or slow rate, dependent upon the amount of applied heat. This circulation stirs and mixes the contents, creates movement preventing contents sticking to the pot walls and thus keeps contents from burning, even over long applied periods of cooking. The circulation may be timed and made more, or less vigorous by applying more intense heat for faster flow at shorter intervals, or less heat for more moderate flow at longer intervals, and such rates may be varied while cooking is in progress, to suit the circumstances.

Circulation may be rendered more effective, particularly for mixing purposes, by providing vanes such as shown at 18, in the top of the dome, curved in spiral form to impart rotation to the upward and downward surging liquid.

These vanes are shown as created by U-shaped cross sectional depressions formed in the top of the dome. This construction provides grooves in the upper surface of the dome for imparting rotative effect to the contents flowing over the upper surface of the dome. These integrally formed ribs also stiffen and reinforce the dome, enabling the same to be formed out of relatively light sheet metal.

While particularly effective as an automatic cooker, the same apparatus may be used as a washer, as shown in Fig. 3, by simply applying a screen 19 to the riser to hold the clothes down in the space above and surrounding the dome.

This hold-down screen may be secured in adjusted relation below the float, as by means of a set screw 20 in the central collar 21 of the screen for engagement with the riser 9.

Figs. 4, 5 and 6 show a form of valve construction for locating the vent openings in the riser at different effective levels.

In Fig. 4 the riser 9 is shown as having vent openings 12a and 12b at two different levels, and a sleeve 22 is shown rotatably engaged over the riser having one set of openings 12aa to register with the upper riser openings 12a, and a second set of openings 12bb to register with the lower set of riser openings 12b when the sleeve is turned to different positions such as indicated by the markings 23, Fig. 6, on the top of the riser. In this view the sleeve is shown as having an index 24 to register with one or the other of the markings 23, thus to set the riser relief openings at the two different liquid levels, the float in this case riding over the valve tube 22 to cooperate with the selected set of relief openings.

The construction for both cooking and washing purposes is relatively simple and inexpensive, easily assembled and taken apart and easily cleaned.

In Fig. 7 a modification of the clothes washer is illustrated, embodying a series of cups 25 supported by radial arms 26 and a collar 27 adjustably secured on the riser above the float valve.

These cups may be set a slight distance above the normal liquid level so that as the clothes rise with the upward flow of water, they will be pressed against and into the cups with a desirable pressing, squeezing and swishing operation.

What is claimed is:

1. Apparatus of the character disclosed comprising a pot, a dome, means for removably securing said dome in said pot with free communication beneath the lower edge of said dome and the interior of said pot, a riser carried by said dome closed at the top and having a valve opening in the side of the same and a float guided over said riser and arranged to open and close said valve opening in the movements of said float over said riser, and clothes confining means adjustably and removably secured on said riser at a different level and independently of said float and including washing cups supported for engagement by the clothes.

2. Apparatus for effecting circulation for cooking or washing purposes and comprising in combination, a pot, a dome secured in stationary relation in said pot with free communication between interior of the dome and the interior of the pot, a riser carried by said dome and terminating at the top in a close, cylindrical, vertical column having a valve opening in the side of the same below the closed top, an annular float slidingly guided over that portion of the column having the vale opening therein and free to rise above said valve opening to uncover the same upon rise of the liquid contents in the pot about the column thereby to relieve pressure trapped in the closed top portion of the column and permit flow from the pot back into the dome, and said float arranged to close said valve opening upon lowering, with the fall of liquid passing back into the dome and whereby upon lowering of the float with fall of liquid in the pot, the float will cover the valve opening in the side of the closed column to permit accumulation of pressure in the closed column to drive liquid downward in the column and back outward from the dome into the pot to again effect rise of liquid in the pot and valve uncovering, lifting movement of the float.

ALPHONSO FRANK ALBANO.

References Cited in the file of this patent

UNITED STATES PATENTS

| Number | Name | Date |
|---|---|---|
| 83,566 | Sweetland | Oct. 27, 1868 |
| 149,137 | Kolb | Mar. 31, 1874 |
| 358,589 | Bergenheim | Mar. 1, 1887 |
| 387,605 | Stoddart | Aug. 7, 1888 |
| 1,552,464 | Bowerbank | Sept. 8, 1925 |
| 1,570,136 | Fisher | Jan. 19, 1926 |
| 1,635,979 | Saare | July 12, 1927 |
| 1,646,022 | Hagel | Oct. 18, 1927 |
| 1,672,815 | Kettler | June 5, 1928 |

FOREIGN PATENTS

| Number | Country | Date |
|---|---|---|
| 8,893 | Australia | Aug. 18, 1928 |